AUTOMATIC RECORDER-REPRODUCER SYSTEMS

Filed July 5, 1960 7 Sheets-Sheet 1

*INVENTOR.*
WILLIAM H. LYON
*BY*
BLAIR, SPENCER & BUCKLES.
ATTORNEYS.

March 17, 1964 W. H. LYON 3,125,644

AUTOMATIC RECORDER-REPRODUCER SYSTEMS

Filed July 5, 1960 7 Sheets-Sheet 2

INVENTOR.
WILLIAM H. LYON
BY
BLAIR, SPENCER & BUCKLES
ATTORNEYS.

AUTOMATIC RECORDER-REPRODUCER SYSTEMS

Filed July 5, 1960 7 Sheets-Sheet 3

INVENTOR.
WILLIAM H. LYON
BY
BLAIR, SPENCER & BUCKLES
ATTORNEYS.

March 17, 1964 W. H. LYON 3,125,644

AUTOMATIC RECORDER-REPRODUCER SYSTEMS

Filed July 5, 1960 7 Sheets-Sheet 4

INVENTOR.
WILLIAM H. LYON

BY
BLAIR, SPENCER & BUCKLES.

ATTORNEYS.

*INVENTOR.*
WILLIAM H. LYON
*BY*
BLAIR, SPENCER & BUCKLES
ATTORNEYS.

AUTOMATIC RECORDER-REPRODUCER SYSTEMS

Filed July 5, 1960 7 Sheets-Sheet 6

INVENTOR.
WILLIAM H. LYON
BY
BLAIR, SPENCER & BUCKLES
ATTORNEYS.

March 17, 1964 W. H. LYON 3,125,644

AUTOMATIC RECORDER-REPRODUCER SYSTEMS

Filed July 5, 1960 7 Sheets-Sheet 7

INVENTOR.
WILLIAM H. LYON
BY
BLAIR, SPENCER & BUCKLES.
ATTORNEYS.

United States Patent Office 3,125,644

Patented Mar. 17, 1964

3,125,644
AUTOMATIC RECORDER-REPRODUCER SYSTEMS

William H. Lyon, Orange, Conn., assignor to The Soundscriber Corporation, North Haven, Conn.

Filed July 5, 1960, Ser. No. 40,589
14 Claims. (Cl. 179—100.2)

This invention relates to automatically controlled long playing recorder and reproducer systems for the collection and retrieval of information, and more particularly to tape recorder-reproducer systems providing automatic repositioning of the record tape for retrieval of selected items of recorded intelligence during the course of normal recording and playback operations.

Conventional tape recorders and long playing recorder-reproducer apparatus are customarily provided with forward normal-speed tape-moving drive mechanisms for use during the recording and playback operation, and also high-speed tape-drive mechanisms allowing fast winding and rewinding of the tape by the operator in preparation for the next recording or reproducing operation. Such systems have heretofore been used very little in official stenography for the reporting of judicial proceedings and legislative and administrative hearings, because the retrieval of selected bits of information, such as the "re-reading" of questions and answers, was hampered by the complexity of the controls available, which normally required a skilled operator familiar with the particular recording apparatus employed.

Accordingly, a principal object of the present invention is to provide an intelligence collection and retrieval system affording prompt and convenient retrieval of selectable segments of recorded information.

Another object of the invention is to provide systems of the above character employing tape recording and reproducing arrangements and providing convenient positioning and repositioning of the tape for selective retrieval by the operation of convenient control elements.

A further object of the present invention is to provide tape recording and reproducing systems of the above character with provision for automatic back spacing of the recording tape by a predetermined amount during the playback operation.

Another object of the invention is to provide a long-playing recorder-reproducer system of the above character incorporating automatically actuated high-speed tape positioning mechanisms for rapid positioning of recording tape.

Still another object of the invention is to provide tape recording and reproducing systems of the above character affording rapid scanning movement or repositioning of recording tape in both forward and reverse directions.

A further object of the invention is to provide tape recording and reproducing systems of the above character incorporating means associated with take-up reels and feed reels to retain the tape wound thereon during its repositioning movement to prevent undesired unwinding of tape from these reels.

Another object of the invention is to provide tape recording and reproducing systems of the above character incorporating automatically disengageable shoe devices adapted to retain the recording tape in operative position adjacent a recording transducer head and adapted to disengage upon command to release said tape from this operative positition for free repositioning thereof.

Other objects of the invention will in part be obvious and in part pointed out hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 2:
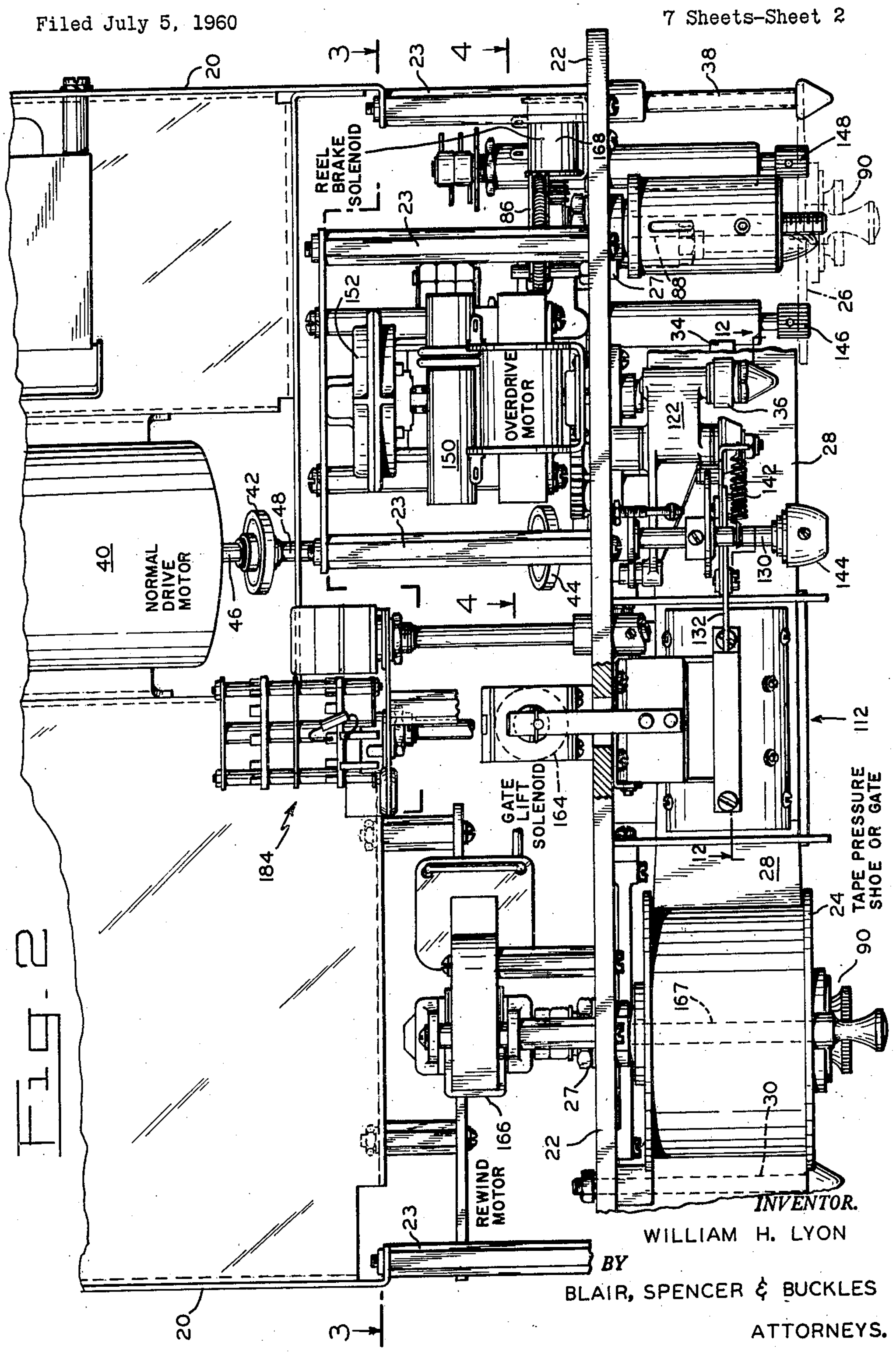
FIGURE 2 is a fragmentary top-plan view of the tape recorder-reproducer shown in FIGURE 1.
Figure 8:
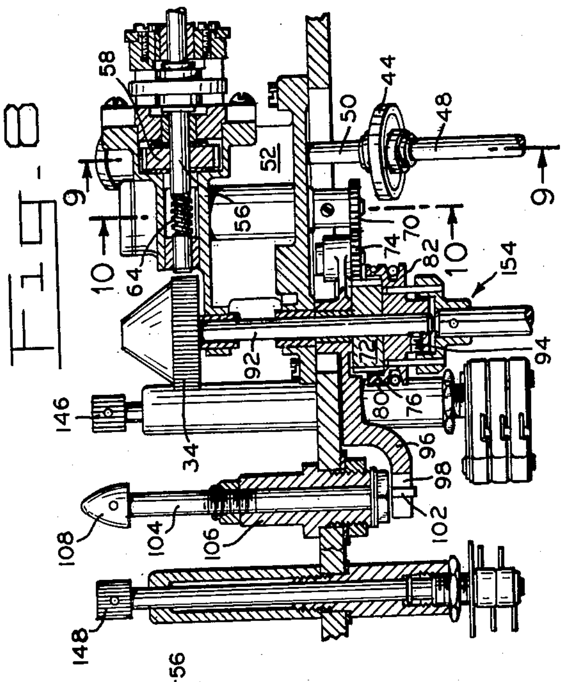
FIGURE 8 is a fragmentary sectional top-plan view of the mechanism shown in FIGURE 4, taken along the line 8—8 in FIGURE 4.
Figure 7:
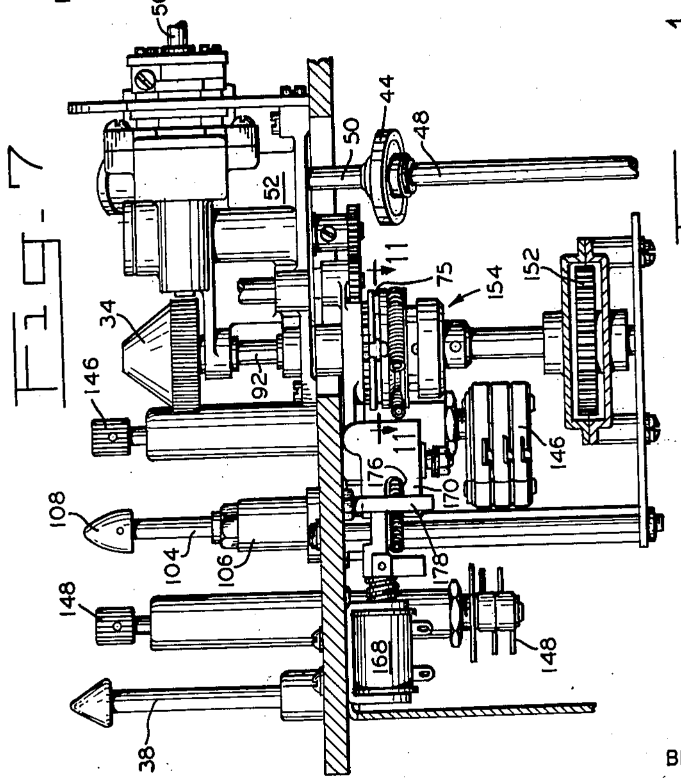
FIGURE 7 is a fragmentary sectional top-plan view of a portion of the apparatus shown in FIGURE 3, taken along the line 7—7 of FIGURE 3.
Figure 9:
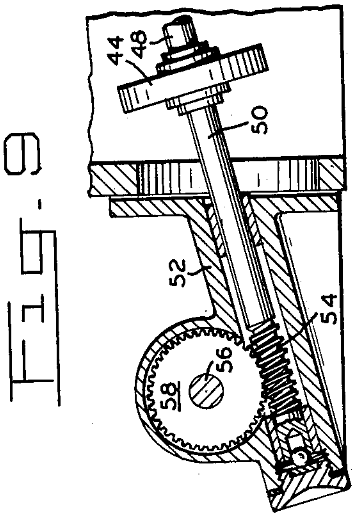
Figure 10:
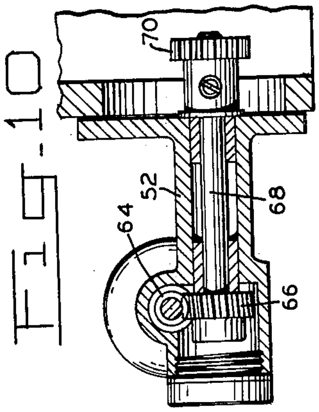
Figure 11:
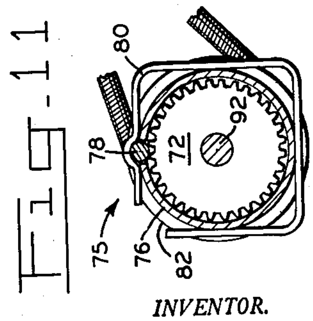
Figures 12, 13:
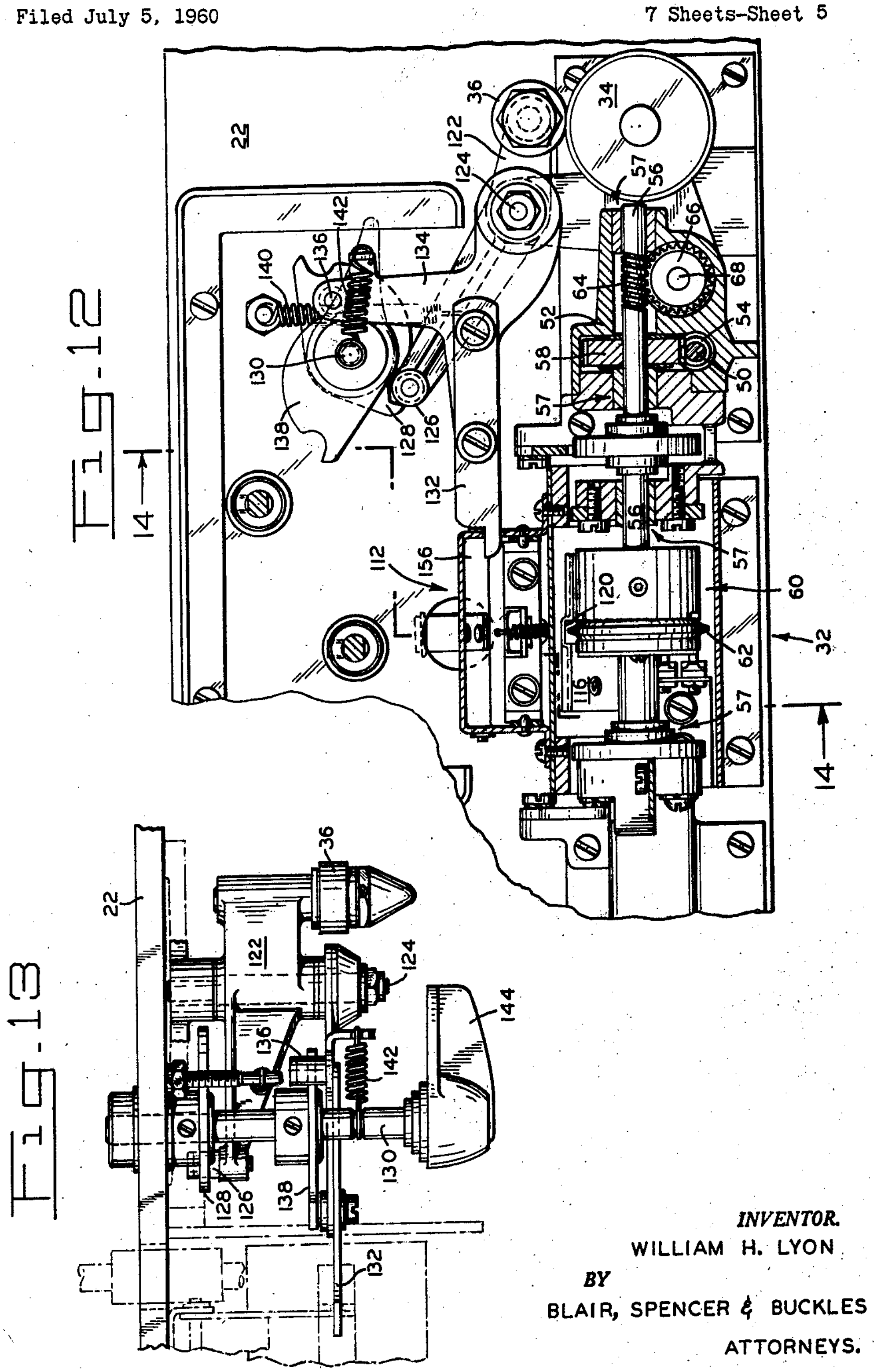
Figures 14, 15, 16, 17:
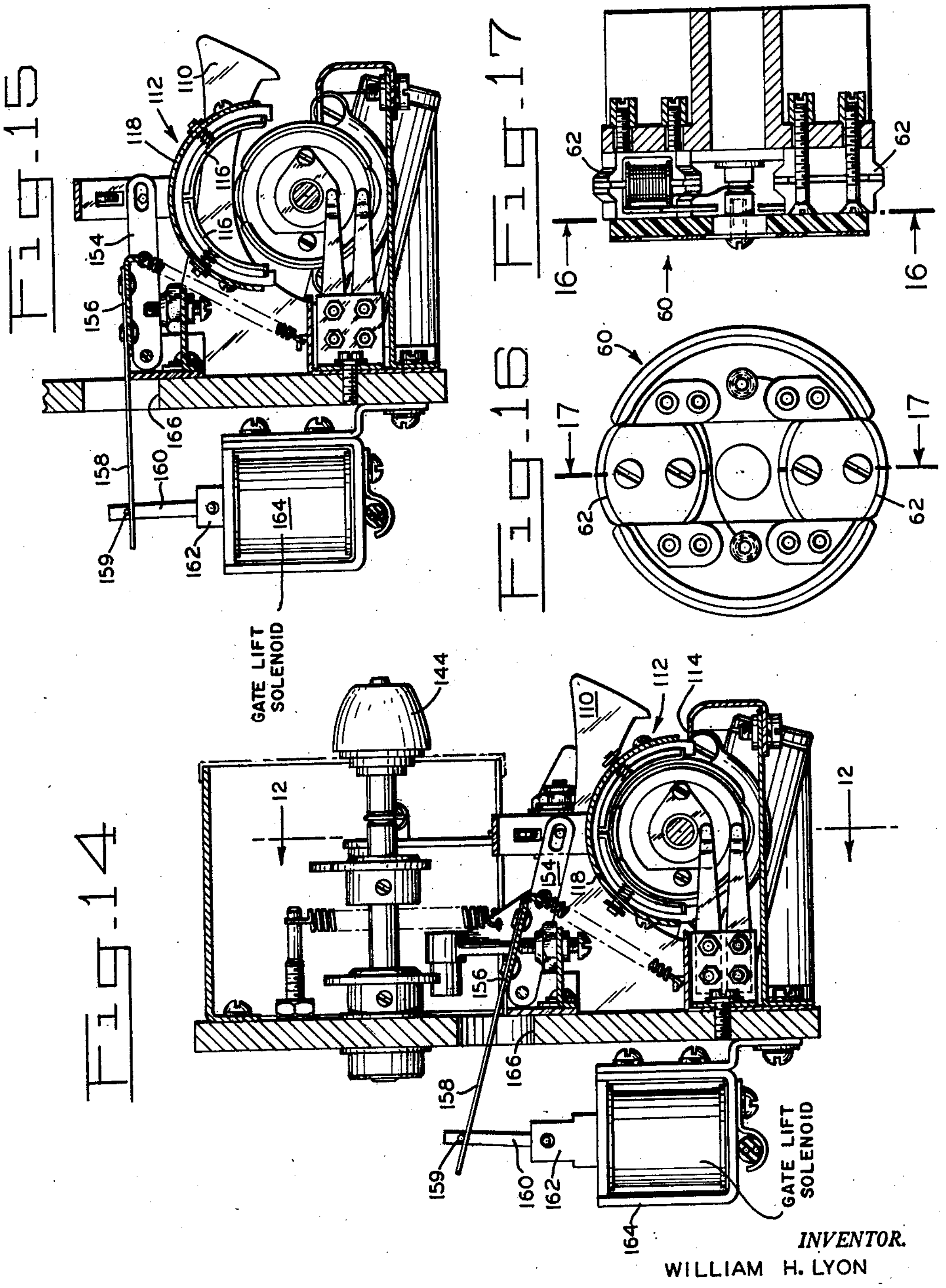
Figure 18:
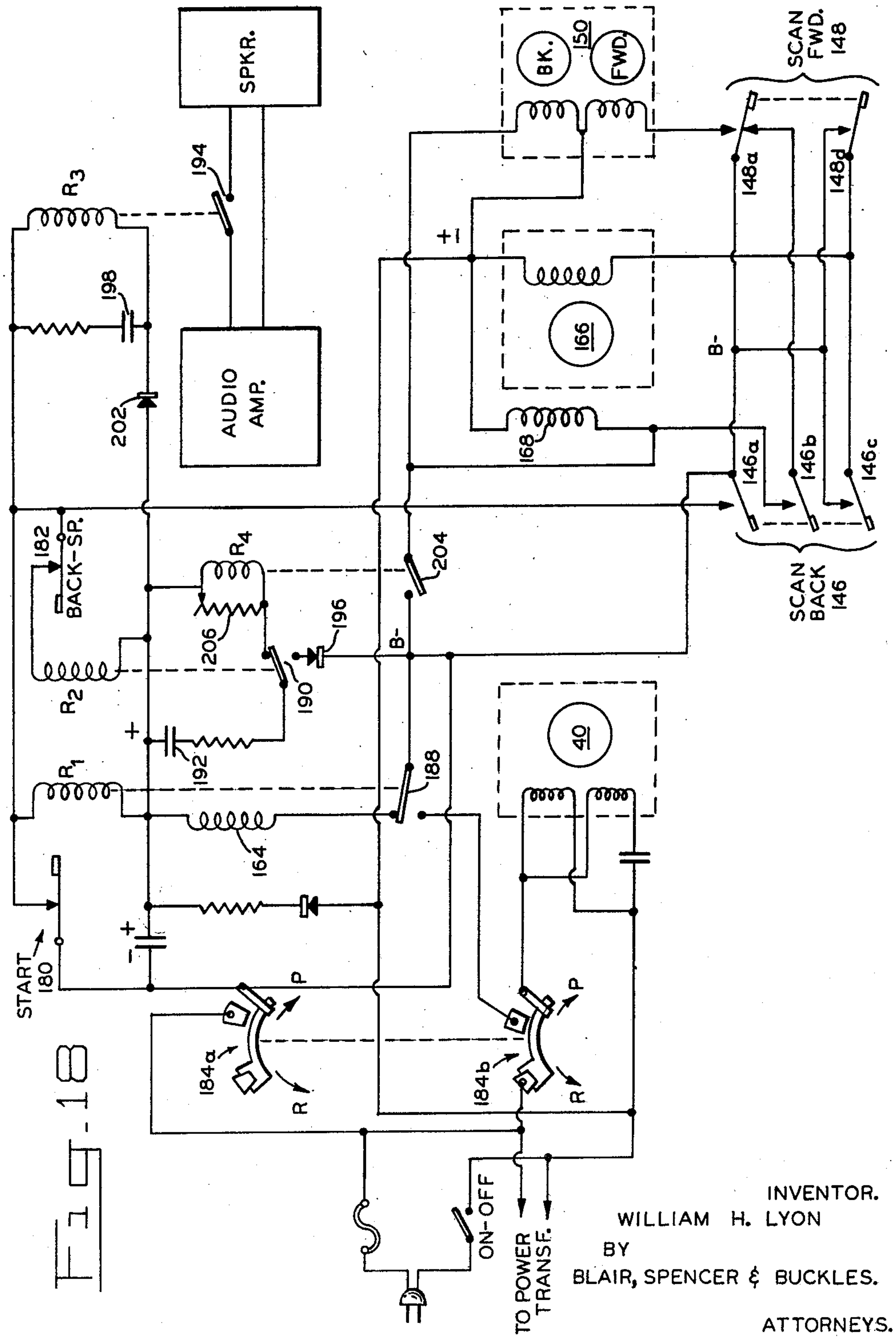

FIGURES 9 and 10 are fragmentary sectional elevation views of the tape drive system shown in FIGURE 8, and taken respectively along the lines 9—9 and 10—10 in FIGURE 8;

FIGURE 11 is a fragmentary sectional elevation view of the portion of the mechanism shown in FIGURE 7, and taken along the line 11—11 of FIGURE 7;

FIGURE 12 is a fragmentary front sectional elevation of a portion of the mechanism shown in FIGURE 2, taken along the line 12—12 in FIGURE 2;

FIGURE 13 is a fragmentary top-plan view of a portion of the mechanism shown in FIGURE 12;

FIGURE 14 is a fragmentary side sectional elevation view of the mechanism shown in FIGURE 12, taken along the line 14—14 of FIGURE 12;

FIGURE 15 is a fragmentary side sectional elevation view of the mechanism shown in FIGURE 14 in a different operating condition;

FIGURE 16 is an enlarged end view of the recording head drum shown in the previous figures;

FIGURE 17 is a sectional front elevation view of the drum shown in FIGURE 16; and FIGURE 18 is a schematic circuit diagram of the electrical switching and control circuits employed with the tape recorder-reproducer apparatus shown in the previous figures.

Similar reference characters refer to similar parts throughout the several views of the drawings.

Figure 1:
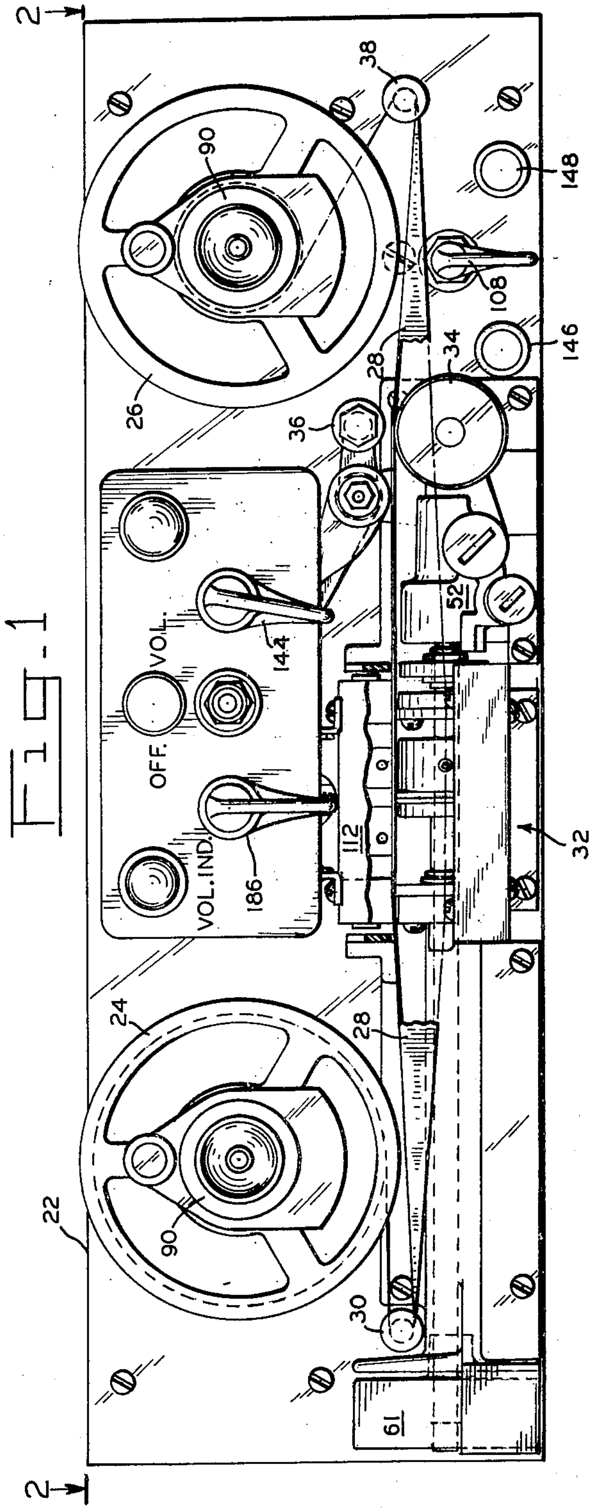
FIGURE 1 is a front elevation view of a long-playing tape recorder-reproducer incorporating one embodiment of the present invention.
Figures 3, 4:
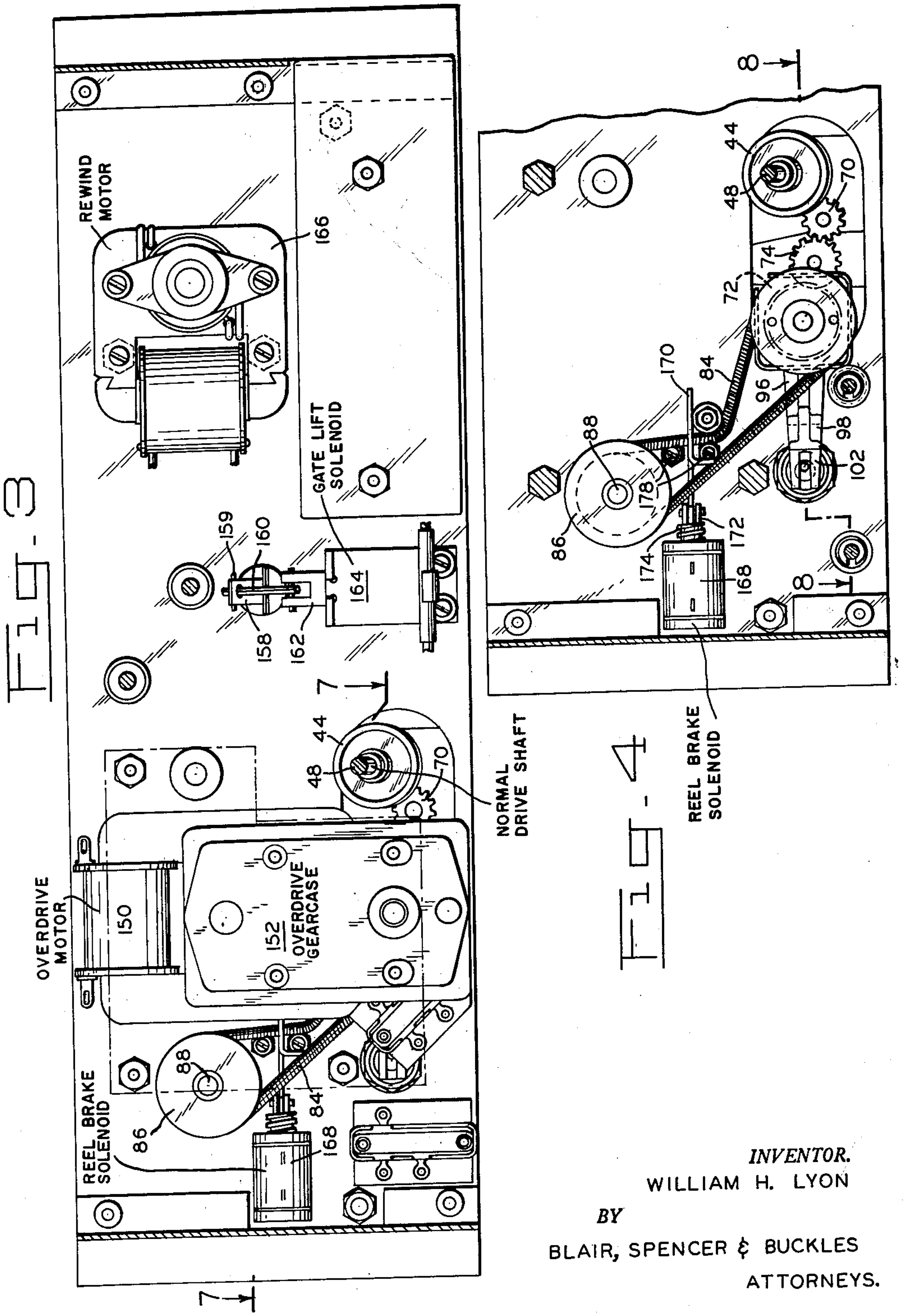
FIGURE 3 is a rear sectional elevation view of the tape recorder-reproducer shown in FIGURE 2, taken along the line 3—3 in FIGURE 2.
FIGURE 4 is a fragmentary rear sectional elevation view of the tape recorder-reproducer shown in FIGURE 2, taken along the line 4—4 in FIGURE 2.

A tape recorder-reproducer incorporating one embodiment of the invention is shown in the figures, and the relationships of its various elements can best been seen in FIGURES 1, 2 and 3. As shown in FIG. 2, a base or chassis 20 supports the various parts of the apparatus, including the electrical input, output, and amplifier circuits (not shown), as well as a main drive motor 40 and the other elements and sub-assemblies hereinafter described. A front panel 22, joined to chassis 20 by such means as the braces 23, forms a mounting plate and supporting structure for the tape handling elements of the machine. Directly behind the panel 22 are mounted the several control motors, solenoids, and the switching circuits which provide the advantages of automatic control, backspacing, and rapid tape scanning for convenient retrieval of recorded information.

Referring to the front elevation view of FIGURE 1, during the normal recording or playback operation the tape 28 is fed from a supply reel 24 to a tape take-up reel 26 mounted on the front of panel 22. In its passage between the supply reel 24 and the take-up reel 26, tape 28 passes around a feed idler 30, past the recording and playback transducer mechanism generally indicated at 32, between a capstan 34 and a capstan follower 36, around a take-up idler 38 and is then wound on the take-up reel 26.

As may be seen in FIGURE 2, the supply reel 24 and the take-up reel 26 are rotatably mounted on the front panel 22 in suitable bearings 27. In addition to the normal drive motor 40 driving the rotating recording and playback transducer unit 32 and the moving record tape 28 through suitable gearing means as will be explained below, the present invention includes a high-speed overdrive motor 150 connected to override the normal drive and move the tape either forward or backward at rapid scanning speed, cooperating with a synchronizing system for repositioning the tape in operative relationship with the rotating transducer unit. Preferably, the high-speed overdrive motor is reversible in order to provide either fast-forward or fast-reverse movement of the tape. Also shown in FIGURE 2 is a gate-lifting solenoid 164 which on command automatically disengages the tape 28 from the rotating transducer 32, to facilitate rapid repositioning of the tape by the high-speed motor 150. The preferred embodiment of the invention also includes arrangements for keeping all excess recording tape neatly wound on the two reels during rapid scanning movement, including a reel brake solenoid 168 for the take-up reel 26 and a rewind motor 166 for the feed reel 24, together with switching circuits providing automatic actuation of these devices when required for optimum performance.

Figure 5:
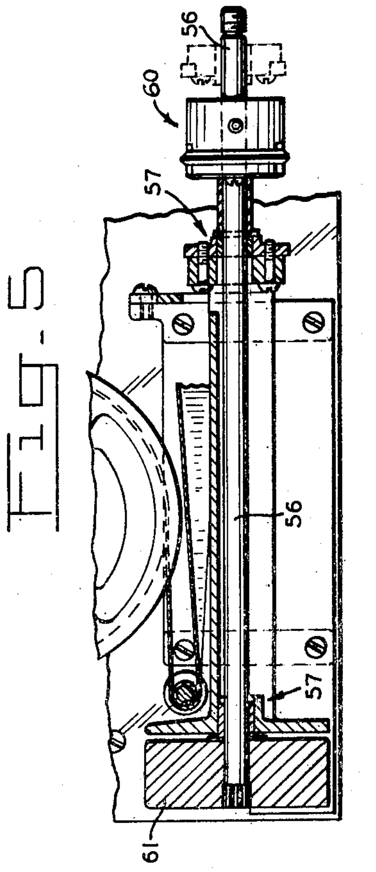
FIGURE 5 is a fragmentary front sectional elevation view of a portion of the mechanism shown in FIGURE 1.

As shown in FIGURES 2 and 9, the main drive motor 40 mounted upon chassis 20 is connected by flexible couplings 42 and 44 joining the motor shaft 46 via a connecting shaft 48 to a worm shaft 50 rotatably supported in drive housing 52. A worm 54 formed on worm shaft 50 drives a main shaft 56 by way of the meshing worm wheel 58 (FIGURE 9). The main shaft 56 is supported in bearings 57 mounted on panel 22, as shown in FIGURES 5 and 12, and a transducer drum 60 is secured to main drive shaft 56 and forms part of the rotating transducer assembly 32. A flywheel 61 is preferably mounted on main shaft 56 to minimize fluctuations in the angular velocity of the rotating transducer assembly 32.

Figure 6:
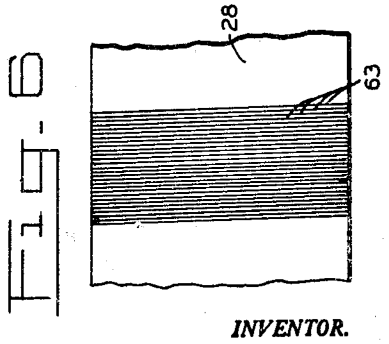
FIGURE 6 is a fragmentary view of the recording tape employed with the mechanism of FIGURE 1, showing diagrammatically the position of consecutive recording intelligence tracks recorded upon the tape by this mechanism.

Transducer drum 60 is shown in more detail in FIGURES 16 and 17. Drum 60 supports two electromagnetic transducer heads 62 at its periphery, and the tape 28 is fed longitudinally past the rotating transducer drum 60. The tape guide means hereinafter described conform the passing tape in a partial cylindrical configuration near the rotating heads 62, which thus sweep across the tape in transverse paths, such as the straight line paths 63 shown in FIGURE 6.

In the embodiment of the invention shown in the figures, the tape driving mechanism includes a worm 64 formed on the main shaft 56 and positioned in meshing, driving engagement with the worm wheel 66 (FIGURE 12), which is drivingly joined by stud shaft 68 to a spur gear 70 (FIGURE 10).

Spur gear 70 drives the capstan driving gear 72 via an idler 74 (FIGURE 8). The driving gear 72 is loosely mounted for free rotation about capstan shaft 92, and is rotatably and drivingly connected to the tape capstan 34 by a multiple-position clutch mechanism 75 best seen in FIGURE 11. The gear 72 is partly enclosed in a peripheral housing ring 76 (FIGURES 8 and 11), and ring 76 has an aperture through which a roller or pawl 78 is urged against the teeth of the capstan driving gear 72 by such means as a resilient wire spring 80. The gear housing ring 76 is joined to and forms a part of a driving sheave 82, accommodating a driving belt 84 preferably formed of a resilient coil spring, and providing a driving connection with a driven sheave 86 (FIGURES 3 and 4) mounted on the take-up reel shaft 88. The take-up reel 26 is secured to shaft 88 by a suitable latching hub and crank mechanism 90 (FIGURE 1), and the feed reel 24 is secured to its shaft 167 by a similar hub mechanism 90 which may take the form shown in my United States Patent No. 2,803,413. The belt 84 drives the driven sheave 86 at the maximum normal angular take-up speed required when the tape 28 is first wound on take-up reel 26. The belt 84 slips on the sheaves 82 and 86 when the tape tension of the partly- or fully-wound tape 28 between constant speed capstan 34 and the take-up reel 26 prevents the take-up reel from rotating at this full angular velocity. Accordingly, a lower angular velocity of take-up reel 26 will be required to keep pace with the normal feed of tape 28 past transducer means 32 by capstan 34, and the slipping of belt 84 on its sheaves produces the tape tension and take-up speed desired.

Referring to FIGURES 8 and 11, driving sheave 82 is joined to capstan shaft 92 by such means as the set screw 94, and the capstan driving gear 72 thus powers the tape driving capstan 34 through the incremental ratchet clutch mechanism comprising elements 72, 74, 76, 78, and 80. The drive mechanism of FIGURE 8 is dimensioned to produce three transverse tracks 63 (FIGURE 6) on the tape, during the longitudinal movement of the tape corresponding to the pitch increment of one tooth on gear 72 in the clutch mechanism 75 shown in FIGURE 11. Indexing of pawl 78 and capstan 34 from one intertooth space to the next about gear 72 thus moves the tape exactly three tracks, forward or backward.

Idler gear 74 is rotatably mounted at one end of the rocking member 96 which is pivotally secured on the capstan shaft 92 (FIGURE 8), and member 96 has a projecting forked crank 98 engaging eccentric 102 on the end of a tuning shaft 104 pivotally secured on panel 22 by the mounting bushing 106 and having a tuning knob 108 mounted on its outer end. Adjustment of the tuning knob 108 and the corresponding movement of eccentric 102 causes light pivotal motion of the rocking member 96 about capstan shaft 92, and correspondingly varies the angular alignment of idler 74 with respect to stud gear 70 and capstan driving gear 72. Adjustment of tuning knob 108 thereby produces longitudinal adjustment or "tuning" of the tape 28 with respect to the revolving transducer heads 62, and thus permits the passing intellingence tracks 63 on tape 28 to be accurately aligned with the revolving heads 62 during the playback operation.

The tape conforming and guiding means preferably employed in this embodiment of the invention are best shown in FIGURES 12, 14, and 15. These include the arcuate tape guide flange 110, the disengageable gate and shoe mechanism generally indicated at 112, and the tape guide shelf 114. The gate mechanism 112 includes curved shoes 116 resiliently mounted on a gate member 118, and having formed in their internal surfaces a recessed groove 120 accommodating the protruding transducer heads 62 for resilient flexible contact between the heads 62 and the passing record tape 28. Tape guide shelf 114 guides tape 28 past the revolving heads 62 and prevents lateral displacement of the tape around the periphery of transducer drum 60 through the frictional action of the transversely-moving transducer heads 62. The foregoing features are more fully described in my United States Patent Nos. 2,803,709, 2,845,495, 2,897,287, 2,856,463 and 2,897,290, and in my copending United States applications, Serial No. 637,430 filed January 31, 1957, and Serial No. 842,112 filed September 24, 1959, now Patent No. 3,054,861.

When loading or unloading a reel of tape, the gate mechanism 112 and the capstan follower 36 are both disengaged to permit free movement of the tape past the transducer drum 60 and the capstan 34. The linkage provided for simultaneous disengagement of these two elements is shown in FIGURES 12 and 13, where it will be seen that the follower 36 is rotatably mounted at the end of a crank arm 122, pivoted about the stud 124 on panel 22, and having its opposite end formed as a follower 126 engaging a cam 128 secured on the pivotally-mounted cam shaft 130. A gate-lifting finger 132 is secured by two screws to a Y-crank 134 which is also pivotally mounted on stud 124. Y-crank 134 has a follower 136 engaging a second cam 138, also mounted on cam shaft 130. Springs 140 and 142 maintain the followers 126 and 136 against their respective cams, and turning of the loading knob 144 clockwise from its "operate" position shown in FIGURE 12 to a "load" position causes the cams to move both followers outwardly away from the cam shaft 130, raising the gate mechanism 112 and also disengaging the capstan follower 36 from the tape 28.

When a reel of tape 28 has been loaded in the machine and threaded past the transducer heads 62 and capstan 34 to be secured to the take-up reel 26, the machine is then ready for automatic operation, actuated by the controls shown schematically in FIGURE 18: a stop-start switch 180 and a backspace switch 182, both preferably in the form of pedal controls, and scan-back and scan-forward switches, both preferably being push switches (146 and 148, respectively, shown in FIGURES 1 and 2) mounted on panel 22 beneath the take-up reel 26 and flanking the tuning knob 108. The scan-back and scan-forward switches 146 and 148 are employed to actuate a reversible overdrive capstan motor 150 (FIGURES 2, 3) directly connected through a reduction gear unit 152 and the linkage 154 to the capstan driving sheave 82 on the capstan shaft 92.

The overdrive motor 150 produces rapid scanning or repositioning movement of the tape 28 in either direction without stopping or affecting the normal drive mechanism described above, because actuation of the motor 150 merely causes the capstan driving sheave 82 with its peripheral gear housing ring 76 to revolve about the capstan driving gear 72, thus causing the pawl 78 (FIGURE 11) to move progressively about the periphery of the capstan driving gear 72 from each inter-tooth space to the next. At all times when power is not supplied to motor 150, the motor or the reduction gears of unit 152 are automatically disengaged from capstan-driving sheave 82 by a spring-urged gear-disengaging arrangement (not shown), thus avoiding undesired friction drag on capstan shaft 92. Whenever the field windings of motor 150 are energized, a driving connection is produced between motor 150 and sheave 82.

If switch 146 or 148 should be released to stop motor 150 at a point where pawl 78 is balanced on the tip of a tooth of gear 72, the normal operation of the drive mechanism shown in FIGURE 8 will not begin to rotate capstan 34 until capstan driving gear 72 has been rotated far enough to bring pawl 78 into the next successive intertooth space, thus initiating movement of the tape in the desired tuned or aligned relationship with the revolving transducer heads 62. This aligned relationship is established by adjustment of the tuning knob 108 at the beginning of the playback operation and is maintained throughout subsequent recording and playback operations, and also following backspacing and rapid scanning repositioning of the tape, because the capstan and follower are in continuous driving engagement with the tape during all such operations. Because an integral number of intelligence tracks 63 are recorded across the tape for each pitch increment or tooth of gear 72, the tuned or aligned relationship between the tracks and the revolving heads 62 is not disturbed by extended rapid scanning movement or repositioning of tape 28.

To avoid jamming or damaging tape 28 during rapid scanning movement, an automatic gate disengaging linkage is provided, as shown in FIGURES 14 and 15. The gate member 118 is pivotally secured at the outward end of arms 154, which are themselves pivotally supported on the front face of panel 22 and joined by a plate 156 having an integral rearwardly-projecting arm 158. The arm 158 is engaged by catch 159 on a link 160 joined to the plunger 162 of a gate solenoid 164 mounted on the rear face of panel 22. Arm 158 may project through an aperture 166 in panel 22 as shown in FIGURE 14. Energization of solenoid 164 will pivot arm 158 and arms 154 counterclockwise about their supporting axis close to panel 22, thus lifting the gate mechanism 112 upwardly to disengage it from tape 28. Manual disengagement of gate mechanism 112 by operation of the loading knob 144 (FIGURE 13) merely lowers arm 158 from catch 159, independently of the action of gate solenoid 164.

As will be shown hereinafter, the actuation of the reversible overdrive scanning motor 150 through the operation of forward or reverse scanning switches 146 and 148 or stepback switch 182 automatically energizes the gate solenoid 164 to provide automatic engagement and disengagement of the gate 112 in cooperation with the backspacing or rapid scanning movement of tape 28 on command.

A rewind motor 166 is mounted on the rear side of panel 22 and drivingly connected to the shaft 167 and hub mechanism 90 of feed reel 24, as shown in FIGURES 2 and 3. Motor 166 is automatically actuated during reverse scanning movement of tape 28 to rewind the backwardly-moving tape on feed reel 24. To maintain tape 28 securely wound on take-up reel 26 during the reverse scanning operation and to avoid unreeling of tape from reel 26, an automatically-actuated brake solenoid 168 is provided, as shown in FIGURES 3 and 4. A brake link 170 is connected to the plunger 172 of brake solenoid 168, and the spring 174 urges the brake link 170 outwardly, away from the brake link solenoid. As shown in FIGURE 7, the link 170 is provided with an aperture 176 accommodating the coil spring belt 84. The belt 84 passes close to two projecting brake studs 178 mounted on the rear side of panel 22 flanking the brake link 170, and preferably covered by soft vinyl sleeves. Studs 178 and link 170 are so positioned that the belt 84 passes freely between them when brake solenoid 168 is de-energized; energization of brake solenoid 168 draws the brake link 170 toward the studs 178, snubbing the belt 84 between the studs and the link, and introducing sufficient frictional resistance to the belt's ordinary motion so that it slips on driving sheave 82 and driven sheave 86. Energization of brake solenoid 168 during reverse repositioning of tape 28 thus blocks the ordinary unwinding rotation of take-up reel 26, and also supplies a braking force to prevent tape 28 from unreeling from reel 26. This brake mechanism thus maintains a preselected amount of reverse tape tension in the tape 28, corresponding to the braking force supplied by the snubbed belt 84 to the driven sheave 86, which tends to resist the reverse rotation of the reel 26.

The control circuits of this embodiment of the invention are shown in FIGURE 18, where it will be seen that the A.C. line voltage is applied to the power transformer (not shown) and to the main drive motor 40 through double-deck ganged "record-playback" selector switch 184 (FIGURES 2 and 18).

A control circuit including the start pedal switch 180 and the three parallel relays R1, R2, and R3 governs the starting and backspacing operations of the system during playback, with the backspacing relay R2 actuating the contacts of a delay switch 190 in a subordinate delay circuit, which includes a fourth relay R4 and a variable resistor 206 employed in adjusting the amount of backspacing to be automatically provided.

The scan-back switch 146 and the scan-forward switch 148 shown in FIGURE 2 and in the lower right-hand corner of the schematic diagram of FIGURE 18 are connected to control the operation of the reversible overdrive motor 150 and such associated elements as the take-up reel brake solenoid 168, the feed reel rewind motor 166, and the gate opening solenoid 164.

The record-playback selector switch 184, shown in FIGURE 2, is controlled by a selector knob 186 shown on the control panel in the upper center of the apparatus shown in FIGURE 1. The two decks 184*a* and 184*b* of the selector switch are shown in detail in the schematic circuit diagram of FIGURE 18. Deck 184*b* applies line power directly to the field windings of main drive motor 40 when the selector switch 184 is in its counterclockwise or "record" position, and the four control relays R1, R2, R3, and R4 are all de-energized because deck 184*a* in the record position disconnects them from the line, thus leaving gate solenoid 164 and brake solenoid 168 isolated and de-energized. Normal recording operation of the machine is therefore initiated solely by the placing of the selector switch 184 into its "record" position in the embodiment shown in the drawings and the schematic diagram of FIGURE 18. The start pedal switch 180, playback pedal switch 182, and the scan-back and scan-forward switches 146 and 148 do not control movement of the tape when the apparatus is in the record condition.

When the selector switch 184 is placed in the clockwise or "playback" position, power is applied by deck 184*a* via normally-closed start pedal switch 180 to the control relays R1, R2, and R3. Energized relay R1 lifts a gate switch 188 to disconnect the main drive motor 40 from the source of power, and also to energize gate solenoid 164, raising the gate mechanism 112 upwardly away from tape 28. Energized relay R2 lifts delay switch 190, allowing the backspace capacitor 192 to discharge through relay R4 and switch 190. Energized relay R3 opens speaker switch 194, disconnecting the speaker from the audio amplifier circuit. The apparatus is thus fully prepared to begin the playback operation.

The operation of the start pedal switch 180 opens the relay circuit and de-energizes the relays R1, R2, and R3. De-energization of relay R1 drops gate switch 188, de-energizing gate solenoid 164 to permit the gate 112 to engage the tape adjacent the transducer heads in playback condition, and the switch 188 now connects the field windings of main drive motor 40 across the line through selector switch decks 184*a* and 184*b*. De-energization of backspace relay R2 permits backspace capacitor 192 to be charged through rectifier 196. De-enerization of relay R3 occurs after a brief delay caused by the discharge of delay capacitor 198, closing switch 194 to connect the audio amplifier to the speaker after the operation of the other relays and solenoids. The delay produced by capacitor 198 isolates the speaker from switching transients and related noise, and permits the main drive motor 40 to reach its normal speed before playback begins, avoiding noticeable pitch fluctuations. The rectifier 202 prevents the delay capacitor 198 from affecting the relays R1 and R2.

When the start pedal switch 180 is released to stop the playback operation, relays R1, R2, and R3 are all energized. Relay R1 lifts gate switch 188 to remove power from main drive motor 40 and apply that power to gate solenoid 164, lifting gate 112. Relay R2 connects the charged capacitor 192 to discharge through relay R4 with a brief surge of energy, momentarily closing reversal switch 204 and applying a surge of power to the belt-snubbing solenoid 168 and the reverse field windings of the overdrive motor 150, thus backspacing the tape 28 by a single inter-toothed notch of the gear 72 in the clutch mechanism 75 and producing backward tape movement of three transverse sound tracks 63. This is normally just enough backward movement to compensate for the normal coasting stop and the acceleration period during starting of the main drive motor 40. Meanwhile, relay R3 was immediately energized, opening the speaker switch 194 to isolate the speaker again during the coasting stop of motor 40 and to block noises created by the operation of the other relays and switches.

Opening of the backspace pedal switch 182 by depression of the backspace pedal de-energizes relay R2 without affecting relays R1 and R3. The resulting opening of delay switch 190 again allows backspace capacitor 192 to charge through rectifier 196. Release of pedal switch 182 connects backspace capacitor 192 to discharge through relay R4, temporarily closing reversal switch 204 and applying a brief surge of power to the reversing windings of overdrive motor 150 as well as the belt-snubbing brake solenoid 168. Adjustment of variable resistor 206 permits selection of backspacing increments of two or more notches of gear 72, corresponding to longer backspacing intervals: six tracks, nine tracks, etc.

The scan-back switch 146, operating through its three sections 146*a*, 146*b*, and 146*c*, performs the following functions simultaneously. Section 146*a* by-passes the start pedal 180 and connects line power to relay R1, energizing gate solenoid 164 and disconnecting main drive motor 40 from its source of power by means of gate switch 188, thus stopping the normal forward movement of the tape and raising the gate mechanism 112. Section 146*b* of the scan-back switch connects power via section 148*a* of the inactive scan-forward switch 148 to the reverse field windings of the overdrive motor 150 as well as to the belt-snubbing brake solenoid 168. The resulting energization of the brake solenoid 168 prevents unreeling of tape 28 from take-up reel 26 during the backward scanning operation. Finally, section 146*c* of the scan-back switch applies power to the windings of the feed reel rewind motor 166, rotating the feed reel in the reverse direction to take up the tape 28 as it is fed backward by the action of the overdrive motor 150 driving the capstan 34 in the reverse direction. Thus, it is evident that, while the scanback switch 146 is depressed, its three sections perform the simultaneous functions required for automatic repositioning of the tape 28 in the reverse direction without injury to the tape and without undesired unreeling of the tape from either the feed reel or the take-up reel.

Operation of the scan-forward switch 148 applies power to the forward field windings of the overdrive motor 150 via section 148*a* of the switch 148, while also applying power to the rewind motor 166 to maintain tension of the tape while it is being driven forward at the high scanning speed. The series arrangement of scan-forward switch section 148*a* with scan-back switch section 146*b* provides protection against simultaneous depression of these two scan switches. The scan-forward switch will then override the scan-back switch, disconnecting belt-snubbing solenoid 168 and the reverse field windings of motor 150, and supplying power to the forward windings of motor 150. The tape will therefore move rapidly forward, and the feed reel rewind motor 166 will maintain tape tension until the scan-forward switch is released. If the scan-back switch remains depressed thereafter, backward scanning tape movement will then begin.

In the control circuit of FIGURE 18, the scan-forward switch is not connected to actuate the gate lifting solenoid 164, and the gate therefore remains engaged while the overdrive scanning motor 150 supplements the normal drive motor 40 to move the tape forward. This arrangement is convenient for momentary intermittent forward scanning in a sound recording machine, but with the higher scanning speeds required in other types of recorders, automatic disengagement of the gate during forward scanning is desirable.

If different automatic control and indicating features are desired with the apparatus of the present invention, such as remote parallel control switches, indicator lights, and the like, suitable changes may, of course, be made in the control and switching circuits of FIGURE 18 to produce the desired modifications of control functions. The switching arrangement illustrated in FIGURE 18 has been found preferable from a practical standpoint, since it provides the necessary safeguards to the tape itself and the recorded intelligence thereon, while affording great convenience in operation and making available both forward and backward rapid scanning of the tape record, together with incremental automatic backspacing.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. In tape recorder-reproducer apparatus having a power-driven capstan roller and associated guide means for directing a recording tape from a feed reel past a rotating transducer head to a take-up reel, the combination comprising a normal capstan drive including motor means for rotatably driving said transducer head and for driving said capstan at a predetermined speed through an incremental clutch, tape repositioning means for overriding said normal capstan drive through said incremental clutch and for driving said capstan at a higher speed than said predetermined speed, a movable and disengagable tape shoe positioned to urge said tape into resilient contact with said transducer head, disengaging means for withdrawing said shoe from said tape, and automatic means for actuating said disengaging means during the operation of said repositioning means, whereby said tape may be freely repositioned for recording or reproducing selected items of intelligence.

2. In tape recorder-reproducer apparatus having a power-driven capstan roller and associated guide means for directing a recording tape from a feed reel past a transducer head to a take-up reel, automatic tape repositioning means comprising, in combination, a reversible overdrive motor, an overdrive clutch drivingly connecting said overdrive motor to said capstan roller, and control means for applying power to said overdrive motor, whereby said record tape may be rapidly repositioned for recording or reproducing selected items of intelligence.

3. In tape recorder-reproducer apparatus having a power-driven capstan roller and associated guide means for directing a recording tape from a feed reel past a transducer head to a take-up reel, automatic tape repositioning means comprising, in combination, an overdrive motor, an overdrive clutch drivingly connecting said overdrive motor to said capstan roller, a disengageable tape shoe positioned to urge said tape into resilient contact with said transducer head, means for disengaging said shoe, and control means for applying power to said overdrive motor and for operating said disengaging means to withdraw said shoe from said tape, whereby said record tape may be rapidly repositioned for recording or reproducing selected items of intelligence.

4. In tape recorder-reproducer apparatus having a power-driven capstan roller and associated guide means for directing a recording tape from a feed reel past a transducer head to a take-up reel, automatic tape repositioning means comprising, in combination, an overdrive motor, an overdrive clutch drivingly connecting said overdrive motor to said capstan roller, a disengageable tape shoe positioned to urge said tape into resilient contact with said transducer head, actuating means for disengaging said tape shoe from said tape, and control means for applying power to said overdrive motor and to said actuating means to disengage said shoe from said tape, whereby said record tape may be rapidly repositioned for recording or reproducing selected items of intelligence.

5. In tape recorder-reproducer apparatus having a power-driven capstan roller and associated guide means for directing a recording tape from a feed reel past a transducer head to a take-up reel, automatic tape repositioning means comprising, in combination, an overdrive motor, an overdrive clutch drivingly connecting said overdrive motor to said capstan roller, a tape shoe positioned to urge said tape into resilient contact with said transducer head, a movable gate supporting said shoe in disengageable relationship with said tape, actuating means for said movable gate including a gate solenoid connected to move said gate for disengaging said shoe from said tape, and control means for applying power to said overdrive motor and to said gate solenoid to disengage said shoe from said tape, whereby said record tape may be rapidly repositioned for reproducing selected portions of intelligence recorded thereon.

6. In tape recorder-reproducer apparatus having a power-driven capstan roller and associated guide means for directing a recording tape from a feed reel past a transducer head to a take-up reel, automatic tape repositioning means comprising, in combination, an overdrive motor, an overdrive clutch drivingly connecting said overdrive motor to said capstan roller, a movable and disengageable tape shoe positioned to urge said tape into resilient contact with said transducer head, control means for applying power to said overdrive motor, and means for maintaining said record tape in wound condition on said reels during operation of said overdrive motor, whereby said record tape may be rapidly repositioned for reproducing selected portions of intelligence recorded thereon.

7. In tape recorder-reproducer apparatus having a power-driven capstan roller and associated guide means for directing a recording tape from a feed reel past a transducer head to a take-up reel, automatic tape repositioning means comprising, in combination, an overdrive motor, an overdrive clutch drivingly connecting said overdrive motor to said capstan roller, a movable and disengageable tape shoe positioned to urge said tape into resilient contact with said transducer head, control means for applying power to said overdrive motor, and means for maintaining said record tape in wound condition on said reels during operation of said overdrive motor, including a rewind motor drivingly connected to said feed reel, whereby said record tape may be rapidly repositioned for reproducing selected portions of intelligence recorded thereon.

8. In tape recorder-reproducer apparatus having a power-driven capstan roller and associated guide means for directing a recording tape from a feed reel past a transducer head to a take-up reel, automatic tape repositioning means comprising, in combination, an overdrive motor, an overdrive clutch drivingly connecting said overdrive motor to said capstan roller, a movable and disengageable tape shoe positioned to urge said tape into resilient contact with said transducer head, control means for applying power to said overdrive motor, and means for maintaining said record tape in wound condition on said reels during operation of said overdrive motor, including a brake mechanism for applying a braking torque to said take-up reel, whereby said record tape may be rapidly repositioned for reproducing selected portions of intelligence recorded thereon.

9. In tape recorder-reproducer apparatus having a power-driven capstan roller and associated guide means for directing a recording tape from a feed reel past a transducer head to a take-up reel, automatic tape repositioning means comprising, in combination, an overdrive motor, an overdrive clutch drivingly connecting said overdrive motor to said capstan roller, a movable and disengageable tape shoe positioned to urge said tape into resilient contact with said transducer head, control means for applying power to said overdrive motor, and means for maintaining said record tape in wound condition on said reels during operation of said overdrive motor, including a rewind motor drivingly connected to said feed reel and a brake mechanism for applying a braking torque to said take-up reel, whereby said record tape may be rapidly repositioned for reproducing selected portions of intelligence recorded thereon.

10. A long-playing transverse tape recorder-reproducer comprising in combination, guide means including a capstan for directing a wide recording tape from a feed reel to a take-up reel, support means for rotatably supporting a transducer head adjacent said tape so that said transducer head sweeps across said tape in a plurality of parallel tracks transverse to the axis of tape movement, a normal drive including a motor connected to rotate said transducer and also connected through an incremental clutch to rotate said capstan at a predetermined speed synchronized with the rotational speed of said transducer head, the increments of said incremental clutch corresponding to an integral number of said transverse tracks, overdrive means connected to rotate said capstan at a higher speed that said predetermined speed and override the normal drive through said incremental clutch, and control means for selectively actuating said overdrive means, whereby said incremental clutch will resynchronize said transducer head with said transverse tracks after operation of said overdrive means.

11. The combination of claim 10, wherein said control means comprises adjustable timing means for selecting the length of time that said overdrive means is actuated.

12. In tape recorder-reproducer apparatus, the combination comprising guide means including a capstan for directing a wide recording tape from a feed reel to a take-up reel, support means for rotatably supporting a transducer head adjacent said tape so that said transducer head sweeps across said tape in a plurality of parallel tracks transverse to this axis of tape movement, a normal capstan drive including a motor connected to rotate said transducer and connected through an incremental clutch to rotate said capstan in a first direction at a predetermined speed synchronized with the rotational speed of said transducer head, each increment of said incremental clutch corresponding to an integral number of said transverse tracks, overdrive means connected to rotate said capstan in the reverse direction at a higher speed than said predetermined speed and to override the normal capstan drive through said incremental clutch, and control means for selectively actuating said overdrive means, whereby said incremental clutch will resynchronize said transducer head with said transverse tracks after operation of said overdrive means.

13. The combination of claim 12, further comprising braking means for applying a braking torque to said take-up reel, said braking means being actuated by said control means concurrently with actuation of said overdrive means.

14. In long-playing transverse tape recorder-reproducer apparatus having a power-driven capstan roller and associated guide means for directing a wide recording tape from a feed reel past a rotating transducer head to a take-up reel in which a plurality of transverse intelligence tracks are thereby recorded across said recording tape, automatic tape repositioning means comprising, in combination, a reverse overdrive motor, an incremental overdrive clutch means drivingly connecting said overdrive motor to said capstan roller to drive said tape in rapid scanning movement in a reverse direction in incremental steps corresponding to an integral number of said transverse intelligence tracks, and control means for actuating said overdrive motor, whereby upon command said record tape may be rapidly repositioned by one of said incremental steps for recording or reproducing selected items of intelligence.

References Cited in the file of this patent

UNITED STATES PATENTS

| | | |
|---|---|---|
| 1,545,078 | Angus | July 7, 1925 |
| 2,897,290 | Lyon | July 28, 1959 |